US011262743B2

(12) United States Patent
Shetty B et al.

(10) Patent No.: US 11,262,743 B2
(45) Date of Patent: Mar. 1, 2022

(54) PREDICTING LEADING INDICATORS OF AN EVENT

(71) Applicant: SAP SE, Walldorf (DE)

(72) Inventors: Rashmi Shetty B, Fremont, CA (US); Leonard Brzezinski, San Jose, CA (US); Lauren McMullen, El Dorado Hills, CA (US); Harpreet Singh, Fremont, CA (US); Karthik Mohan Mokashi, San Ramon, CA (US); Simon Lee, San Ramon, CA (US); Lukas Carullo, Walldorf (DE); Martin Weiss, Walldorf (DE); Patrick Brose, Walldorf (DE); Anubhav Bhatia, Walldorf (DE)

(73) Assignee: SAP SE, Walldorf (DE)

( * ) Notice: Subject to any disclaimer, the term of this patent is extended or adjusted under 35 U.S.C. 154(b) by 257 days.

(21) Appl. No.: 16/276,876

(22) Filed: Feb. 15, 2019

(65) Prior Publication Data
US 2020/0159203 A1    May 21, 2020

Related U.S. Application Data

(60) Provisional application No. 62/770,246, filed on Nov. 21, 2018.

(51) Int. Cl.
*G05B 23/02* (2006.01)
(52) U.S. Cl.
CPC ..... *G05B 23/0283* (2013.01); *G05B 23/0289* (2013.01)

(58) Field of Classification Search
CPC ............ G05B 23/0283; G05B 23/0289; G05B 23/024
See application file for complete search history.

(56) References Cited

U.S. PATENT DOCUMENTS

| | | | | |
|---|---|---|---|---|
| 5,940,290 | A * | 8/1999 | Dixon ................ | G05B 23/0283 700/9 |
| 2009/0189617 | A1* | 7/2009 | Burns ..................... | E21B 43/24 324/649 |
| 2014/0110167 | A1* | 4/2014 | Goebel ................... | E21B 44/00 175/24 |
| 2015/0226049 | A1* | 8/2015 | Frangos ................. | E21B 49/00 702/6 |

(Continued)

*Primary Examiner* — Mischita L Henson
(74) *Attorney, Agent, or Firm* — Buckley, Maschoff & Talwalker LLC

(57) ABSTRACT

Provided is a system and method for predicting leading indicators for predicting occurrence of an event at a target asset. Rather than rely on traditional manufacturer-defined leading indicators for an asset, the examples herein predict leading indicators for a target asset based on actual operating conditions at the target asset. Accordingly, unanticipated operating conditions can be considered. In one example, the method may include receiving operating data of a target resource, the operating data being associated with previous occurrences of an event at the target resource, predicting one or more leading indicators of the event at the target resource based on the received operating data, each leading indicator comprising a variable and a threshold value for the variable, and outputting information about the one or more predicted leading indicators of the target resource for display via a user interface.

21 Claims, 7 Drawing Sheets

(56) References Cited

U.S. PATENT DOCUMENTS

| | | | |
|---|---|---|---|
| 2017/0102696 A1* | 4/2017 | Bell | G05B 23/024 |
| 2017/0161628 A1* | 6/2017 | Chiba | G06F 40/103 |
| 2018/0023804 A1* | 1/2018 | Qin | C02F 1/24 |
| | | | 126/609 |
| 2018/0087357 A1* | 3/2018 | Conn | E21B 43/2408 |
| 2018/0284735 A1* | 10/2018 | Celia | G05B 23/0264 |
| 2019/0368973 A1* | 12/2019 | Wevita | G05B 19/048 |

* cited by examiner

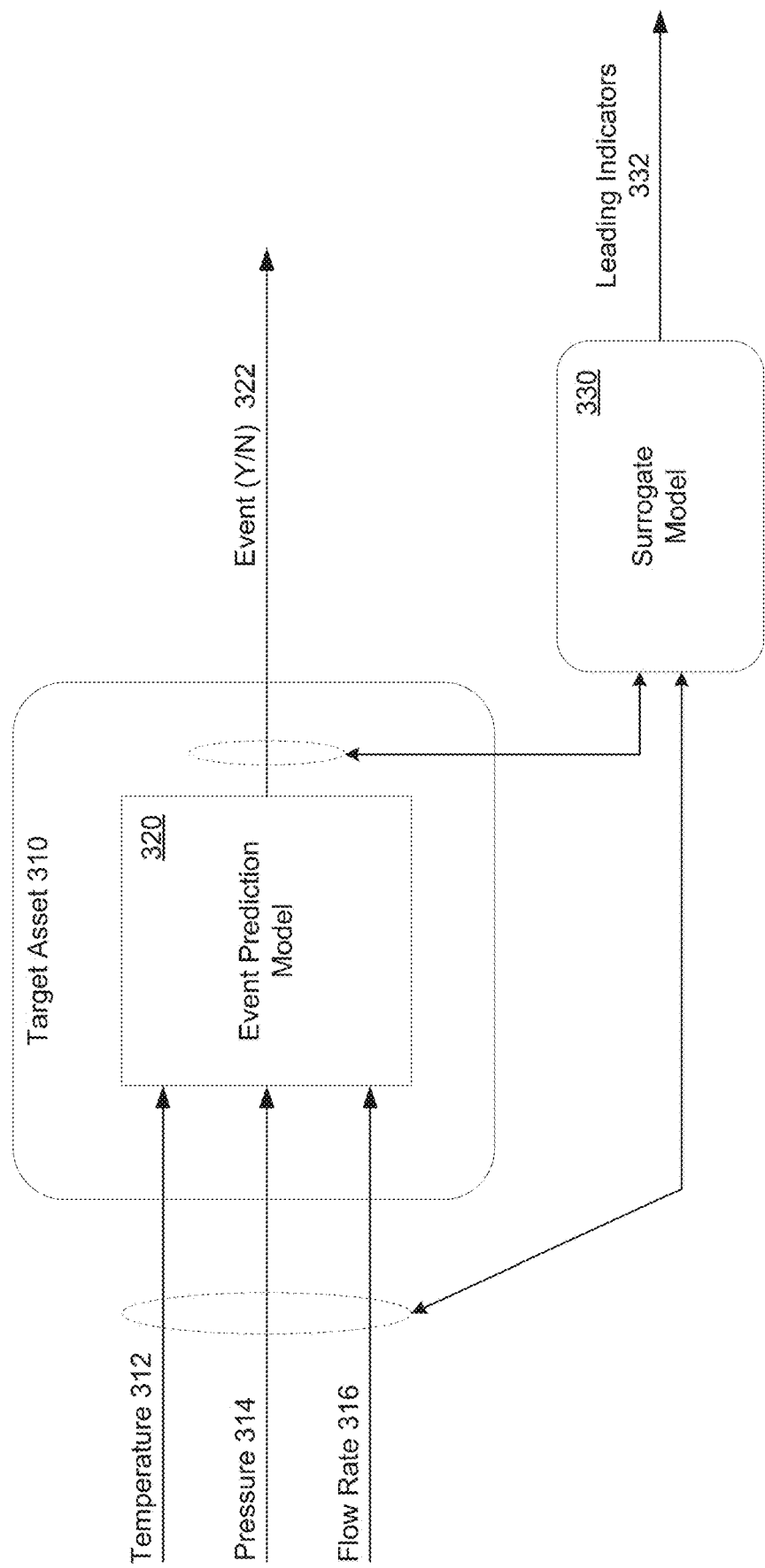

```
┌─────────────────────────────────────────────┐ 510
│ Receiving Operating Data associated with an │
│ Event that Previously Occurred at a Target  │
│ Resource                                    │
└─────────────────────────────────────────────┘
                       │
                       ▼
┌─────────────────────────────────────────────┐ 520
│ Predicting One or More Leading Indicators   │
│ of the Event at the Target Resource based   │
│ on the Received Operating Data              │
└─────────────────────────────────────────────┘
                       │
                       ▼
┌─────────────────────────────────────────────┐ 530
│ Outputting Information about the One or     │
│ More Predicted Leading Indicators via a     │
│ Display                                     │
└─────────────────────────────────────────────┘
```

PREDICTING LEADING INDICATORS OF AN EVENT

CROSS-REFERENCE TO RELATED APPLICATION(S)

This application claims the benefit under 35 USC § 119(e) of U.S. Provisional Patent Application No. 62/770,246, filed on Nov. 21, 2018, in the United States Patent and Trademark Office, the entire disclosure of which is incorporated herein for all purposes.

BACKGROUND

Physical assets (e.g., machinery and equipment used in industry, manufacture, etc.) must be monitored and maintained to remain working properly. To understand and predict performance of an asset, users often rely on leading indicators to help predict the occurrence of a future event (e.g., a machine breakdown, a repair, a part replacement, error codes being displayed, quality events, customer complaints, and the like.) Sensors may be attached on or around an asset and may be used to capture measurements of various features of the asset during operation. Leading indicators may include measured features or variables (e.g., temperature, pressure, altitude, humidity, flow rate, vibration, etc.) that have time-series values that are most correlated with the occurrence of the event. As another example, leading indicators may include attributes related to an asset such as operating conditions, operational hours or age, model number, asset type, operator, etc. For example, leading indicators can include an identification of a specific variable and a condition of the variable which indicates future occurrence of an event. Leading indicators can help an engineer or other user build more effective Condition-Based Maintenance (CBM) rules and predictive models (e.g., fault prediction) thereby providing operators of the asset with a chance to correct an issue before it progresses into an event.

Leading indicators are typically established by a manufacturer. Manufacturers may create generalized leading indicators that are not specific to a particular asset and its conditions but are adequate for general types of operating environments where an asset may be placed. Often, the leading indicators are determined while testing the asset in a vacuum or other environment. However, manufacturer-defined leading indicators are set in advance, and fail to consider factors associated with an asset (e.g., environment, materials, operating conditions, other assets, etc.) when it is deployed. As will be appreciated, different factors can significantly influence what causes events. Accordingly, a new mechanism is needed for identifying leading indicators.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a process of predicting leading indicators based on an event prediction algorithm in accordance with an example embodiment.

FIG. 5 is a diagram illustrating a method of predicting leading indicators of an event in accordance with an example embodiment.

Figure 1:
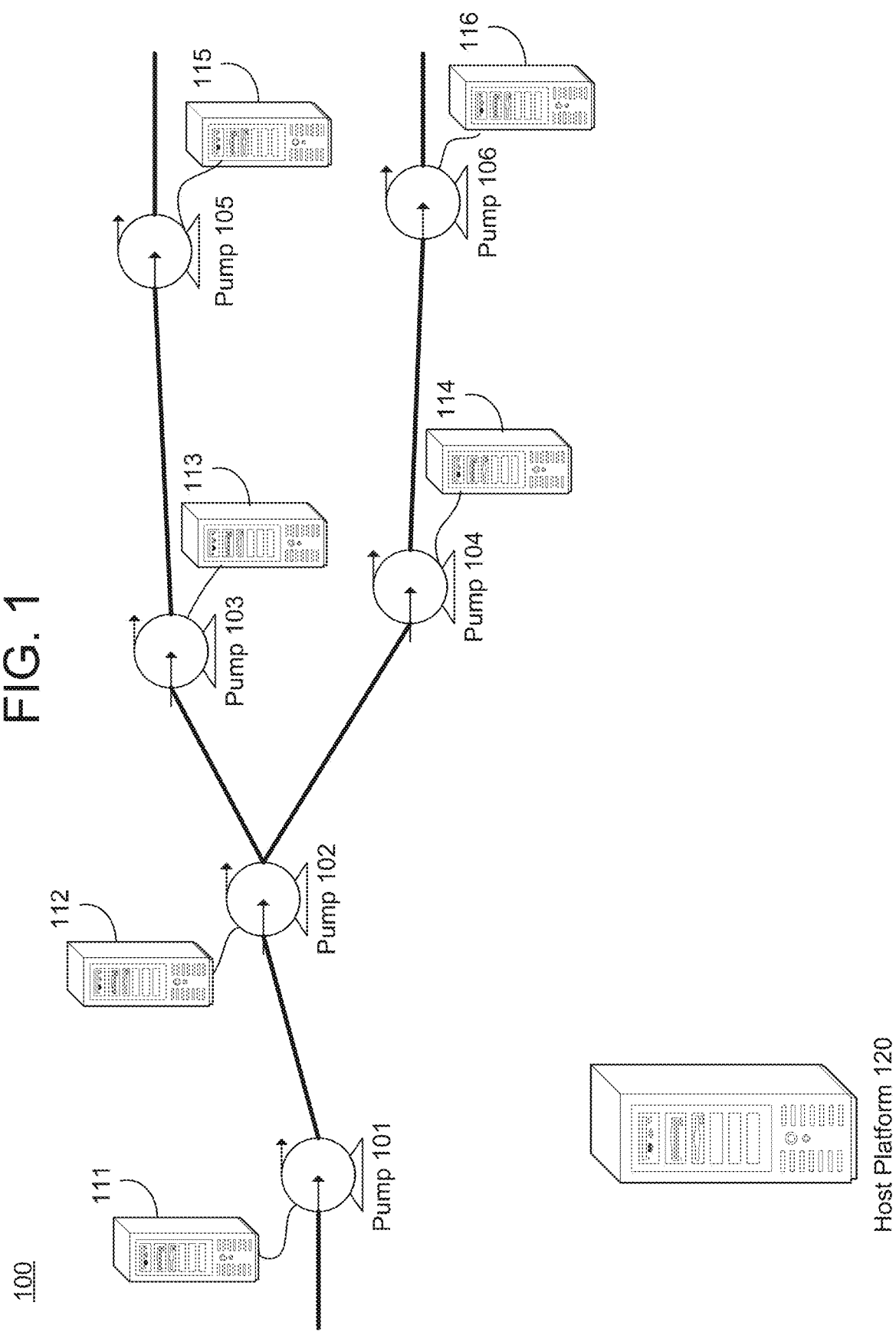
FIG. 1 is a diagram illustrating an environment including a group of assets performing an industrial operation in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

An organization that owns and/or operates a machine or equipment asset (also referred to herein as a resource, a target resource, an industrial resource, etc.) may rely on condition-based maintenance to monitor the operation of the asset and predict future events that will occur at the asset. As a non-limiting example, events may include breakdowns (and other failures). Events may also include more robust issues such as error codes being displayed, quality events, customer complaints, and the like. Furthermore, event types such as a failure may be categorized into different failure modes (i.e., different ways an asset may fail). For example, a pump may fail due to overheating, leakage, lack of pressure, and the like. Each type of failure mode may have its own leading indicators. By predicting such events, an operator may take steps proactively to maintain an asset (e.g., fix a problem, by a new part, change machine controls, etc.) and thereby prevent the event from occurring. Typically, manufacturers of the equipment and/or machines provide leading indicators in a generic way. An indicator may include a variable (e.g. temperature, pressure, flow rate, vibration, humidity, etc.) in combination with a condition/threshold value for the variable (e.g., a temperature greater than 80 degrees, etc.)

The leading indicator(s) are indicators which correlate most closely with occurrence of the event. For example, indicators include measures (time-series data) that is repeatedly measured over time. Other indicators include attributes associated with the model. These attributes may not be time-series data but may be information about the asset itself or an operator. For example, other indicators may include an operator of the asset, a model number, a model type from this manufacturer, a number of hours operated, an age of the equipment, and the like. These attributes don't change over time whereas measures or measurements change over time. Accordingly, monitoring software and failure prediction algorithms can use leading indicators to anticipate occurrence of the event. Often, leading indicators are incorporated into alert rules. However, individual assets operate in different environments with different materials and assets around them. The dynamic nature of the use and conditions of an asset cannot be predicted in advance by the manufacturer. Furthermore, manufacturers cannot account for measured leading indicators or attribute-based leading indicators (e.g., certification level of an operator, upstream asset performance, etc.) of an asset once deployed which may also be associated with an event.

To address these drawbacks, the example embodiments provide a system which uses automated machine learning to identify, for a respective asset (e.g., equipment, machine, resource, etc.), what are the most significant leading indicators. The leading indicators may include one or more sensors (e.g., temperature, pressure, noise, vibration, flow rate, humidity, etc.) and the relevant threshold values that correlate to event occurrence. The system may determine what specific indicators (local to a target asset and/or surrounding assets) that are associated with the occurrence of an event at the target asset. As a result, different deployments of the same type of asset may have different leading indicators. The system may export the identified leading indicators into an alarm system for execution with minimal user interactions. As an example, for machines/equipment, leading indicators can include sensors disposed on or around an asset and also a value/threshold for the sensor. In more complex systems, the system may also identify operating conditions at other assets (e.g., upstream from a target asset) as well as operator skills which can be used as leading indicators for the target asset.

Determining a leading indicator for an event entails an intricate understanding of which features are important when building a model that classifies the characteristics of the event. Feature importance is a generic term which refers to the extent to which a predictive model relies on a particular feature. Typically, the more accurate an underlying prediction module the more reliable the features (i.e., leading indicators). Assets are often equipped or associated with a failure prediction model that predicts occurrence of a failure of an asset. As one example, the automated machine learning model of the example embodiments may interpret the inputs and the outputs of a failure prediction model and determine leading indicators for the asset based on the failure prediction model. This would need an interpretation of the model that was used to create the failure predictions (classification). An example of a technique adapted to achieve these results, as further described with respect to FIG. 3, use model-agnostic interpretation techniques. It should also be appreciated that other techniques may be used to generate the automated machine learning model.

The example embodiments improve upon known leading indicator application by introducing a data-driven system which can dynamically identify leading indicators used to predict occurrence of an event for a specific asset rather than relying on generic indicators set by a manufacturer of the asset. The leading indicators may be determined through machine learning based on historical event data of the asset as well as event data of other assets such as those upstream from the asset. The machine learning model may be a surrogate to a failure prediction model of the asset. The leading indicators determined through the data-driven process herein can perform well for each asset even in complex operating environments where other assets are present. A manufacturer cannot anticipate all possible conditions of an asset, in advance. Because of this, when an asset functions in a different environment or a different system then initially contemplated, the leading indicators are not always accurate. The example embodiments provide a technical solution to this problem by dynamically determining leading indicators based on data from the asset over time.

FIG. 1 illustrates an environment 100 including a group of assets performing an industrial operation in accordance with an example embodiment. Referring to FIG. 1, the environment 100 includes a plurality of assets 101, 102, 103, 104, 105, and 106 which in this example are pumps configured to pump material therethrough such as liquid, gas, solid, etc. Each of the assets 101, 102, 103, 104, 105, and 106, are associated with a computing system 111, 112, 113, 114, 115, and 116, respectively. For example, each computing systems 111-116 may be an asset controller, an edge server, an industrial computer (PC), an on-premises server and the like. Each of the computing systems 111-116 may feed data of each of the assets 101-106 to a host platform 120 which can host an application for monitoring and creating alert rules based on the operating performance of the assets 101-106. For example, a user device (not shown) may connect to the host platform 120 via a network, etc., and view information about the operation of the assets 101-106 such as analytics, graphical patterns, alerts, and the like.

In the example of FIG. 1, the assets 101-106 are illustrated as pumps. However, the embodiments herein are not limited thereto. For example, the assets may be any type of machine or equipment for use in industry, manufacture, and the like. As an non-exhaustive example, assets may include gas turbines, power generators, wind turbines, locomotives, aircraft, oil and gas equipment, mining equipment, medical equipment, and the like. In this example, each of the assets 101-106 are of a same type of asset (pumps). However, it should also be appreciated that in more complex system the assets may be of different types with respect to other assets among the group.

According to various embodiments, a machine learning model may be disposed at the computing systems 111-116, the host platform 120, or the like, and can be used to predict future occurrence of events at the assets 101-106. The machine learning model may identify leading indicators of the event at the respective assets within the group. Each asset 101-106 may have different leading indicators for an event. The different leading indicators may include different variables, the same variables with different conditions, and the like. For example, a machine learning model may be disposed on computing system 111 and may be used to predict leading indicators of an event at the asset 101 based on data captured from sensors positioned on or around the asset 101. As another example, the machine learning model may be disposed on the host platform 120 which can be used to predict leading indicators of the event at the asset 101 based on operating performance data captured from the sensors and fed back the host platform by the computing system 111, and/or other computing systems 112-116 from among the group. In some embodiments, the machine learning model may predict leading indicators from attributes of the asset 101 such as age of the asset, model type, manufacturer, operator, and the like.

Figure 2A:
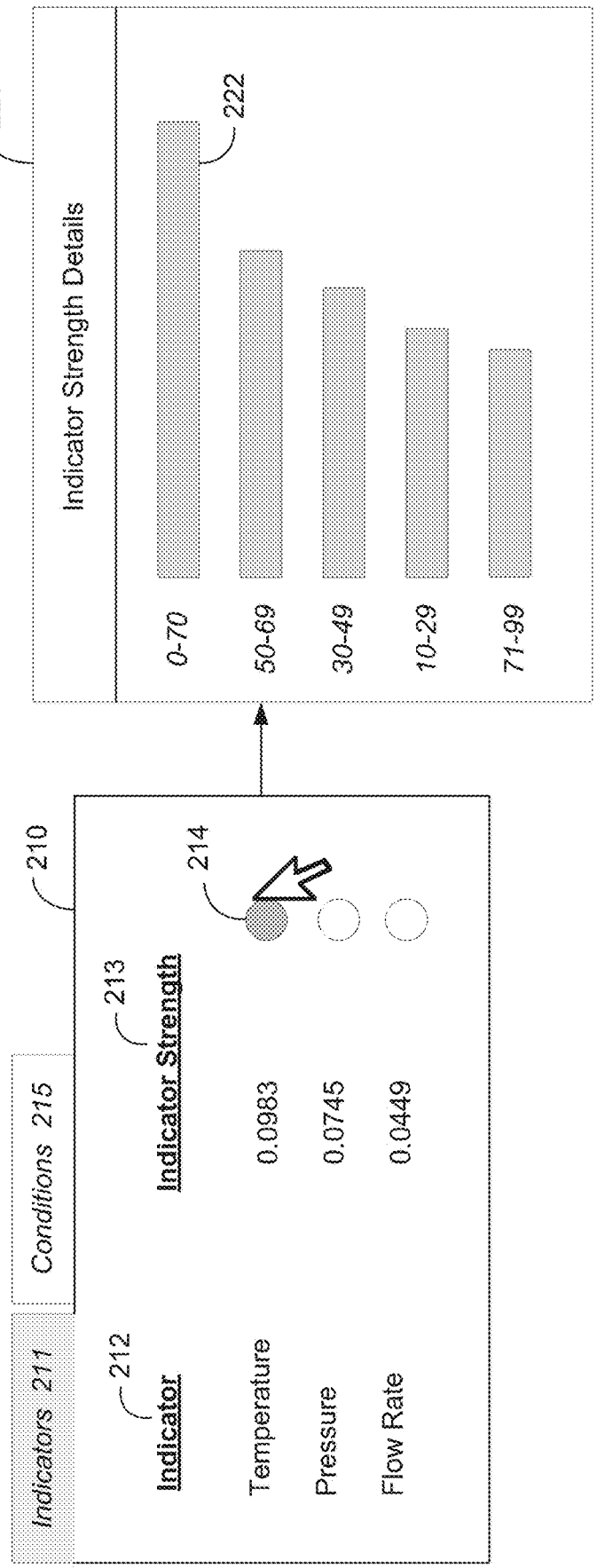
FIGS. 2A-2B are diagrams illustrating user interface screens displaying leading indicators of a target asset in accordance with example embodiments.
Figure 2B:
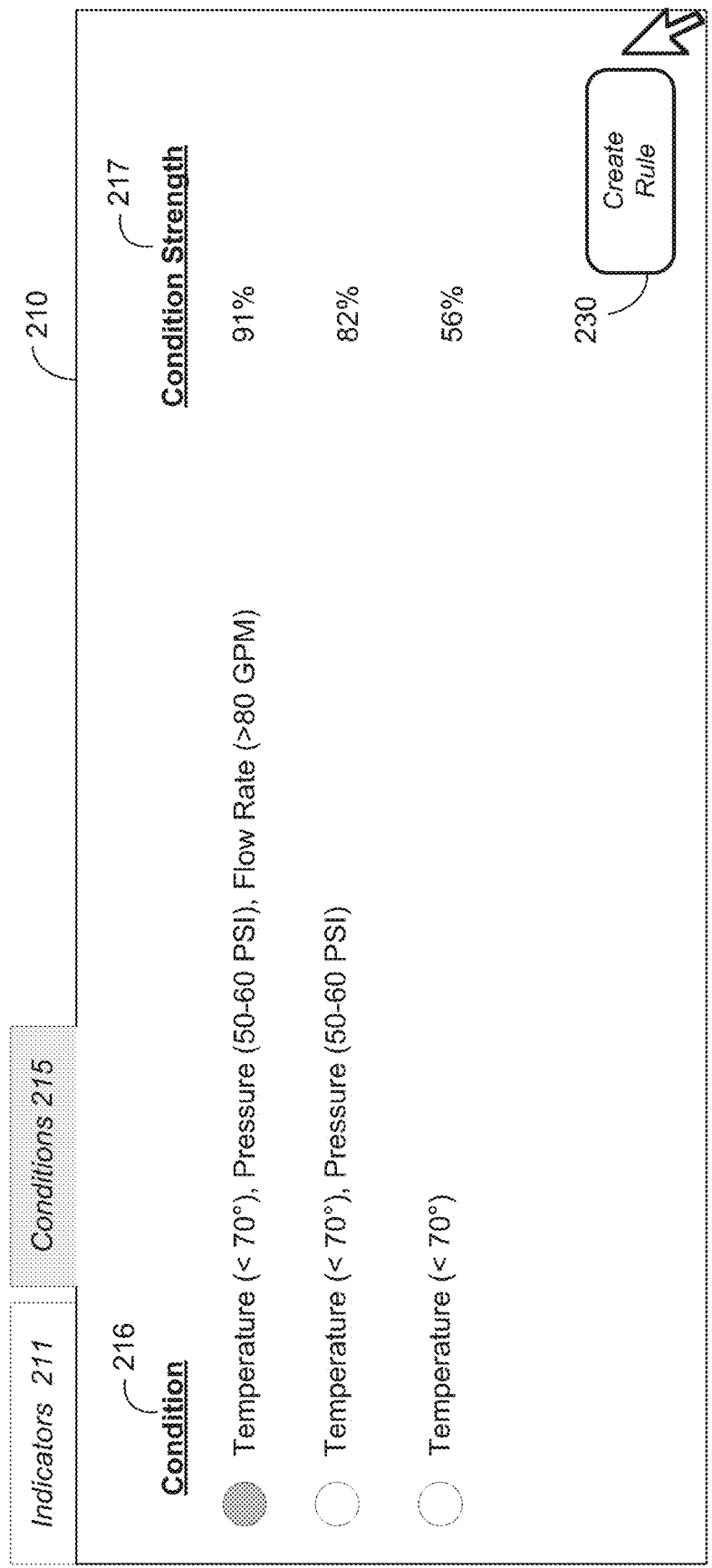

In various embodiments, the machine learning model may automatically determine the leading indicators for an equipment model (asset) in the system that has a sufficient history of sensor data and event data (e.g., failure records, quality concerns, error codes, customer complaints, etc.). As one example of use, a user device may access the host platform 120 and may view a user interface, dashboard, etc. for managing the assets 101-106. Here, a user may navigate to a specific pump's screen and look up its leading indicators such as shown in the examples of FIGS. 2A-2B. The leading indicators may be generated for different types of events. Furthermore, when the event is a failure, leading indicators may be generated for each specific type of failure mode. That is, each failure type may have its own leading indicators. Failure types for a pump include, but are not limited to, overheating, vibration, imbalance of pressure, leaking, and many others. As another example, the failure modes may be generated for the equipment level without specifically identifying the failure modes. As another example, a user may select a set of historical notifications for a pump and view notifications suspected of a same type of failure.

FIGS. 2A-2B illustrate user interface screens 200A and 200B displaying leading indicator information of a target resource in accordance with example embodiments. In these examples, the target resource is a pump, however, embodiments are not limited thereto and the pump is simply shown for purposes of convenience. A non-exhaustive list of other example target resources include turbines, locomotives, aircraft, ships, oil and gas equipment, medical machines and equipment, imaging equipment, and the like. Furthermore, in some embodiments, the target resource may be a classification of assets such as a model type or an equipment type of an asset which covers an entire class/fleet of assets. For example, a particular model of engine could be a target resource with its own leading indicators that can be applied universally to all engines of the same model of the engine. Therefore, the model/type of an asset can be a leading indicator (e.g. model 200 v3 of these pumps when running hotter than n degrees tend to break down a lot"), and the machine learning can also determine the leading indicators for a collection of models that belong to the same class (e.g. leading indicators of model 200 v3 are temperature and pressure; the system should monitor these leading indicators and their conditions for all of these pumps that belong to this model 200 v3).

Referring to FIG. 2A, user interface 200A includes a display of leading indicator information. This page may be displayed by default or it may be selected by the user via a tab at the top of user interface 200A. A first screen 210 includes an indicator page 211 and a tab for a conditions page 215. The indicator page 211 may identify which indicator most closely correlates with the occurrence of an event. Meanwhile, the conditions page 215 (shown in FIG. 2B) may identify which specific conditions of the indicator are most closely correlated with the event.

As shown in FIG. 2A, the indicator page 211 includes a list of indicator variables 212 as well as indicator strengths 213 of the variables 212. The indicator strengths 213 provide the viewer with a ranking or other measurement that allows the user to discern which variables 212 most closely correlate with occurrence of an event. The event, for example, may be a failure. As another example, the event may be a need for maintenance, a part replacement, a change in operating controls, an error code, a customer complaint, quality issues, warranty claims, etc. The "event" may be dynamically set by a user of the system and can be changed or updated at a later time.

Within the indicator page 211, the system displays the leading indicators and their relative rankings (i.e., how relevant is this leading indicator statistically). Furthermore, the user may view an indicator strength detail screen 220 which provides detailed information about the indicator strength of a variable. For example, the indicator strength detail screen 220 may be displayed automatically or in response to a user selecting a button or some other input on the indicator page 211. The indicator strength detail screen 220 may include different threshold values for the variable, as well as how closely the different threshold values correlate to the occurrence of the event thereby providing the viewer with a deeper understanding of the indicator's conditions. The strengths may be represented using visual indicator 222 such as graphs, bar charts, pie charts, or the like.

Referring to FIG. 2B, user interface 200B includes a display of the conditions page 215 which may be provided in response to the user selecting a tab corresponding to the conditions page 215, or automatically as a default page. Through the conditions page 215, the system displays the recommended conditions for each indicator (e.g., temperature <70 degrees, and pressure between 50-60 PSI, and flow rate greater than 80 GPM, etc.). In this example, a list of conditions 216 are displayed corresponding to the list of indicators 212 shown in FIG. 2A. In particular, the list of conditions 216 may include threshold values for one or more of the indicators 212, as well as a condition strength 217 which indicates how closely the values for the one or more indicators correlate to the occurrence of the event. As shown on the conditions page 215, in some cases, multiple indicators (and threshold values thereof) may be displayed when multiple indicators most closely correlate to the occurrence of an event. As another example, a single indicator may most closely correlate to the occurrence of an event.

As further described below with respect to FIG. 2B, a user may review the recommended indicators and conditions (and also review OEM thresholds of these leading indicators, etc.) and clicks on a Create Rule 230 button or other option. By doing so, the system may translate any selected leading indicators and recommend conditions into one or more monitoring rules that can be used by a monitoring system of the target resource. As another example, the system may implement the one or more monitoring rules in an edge system (edge device) to execute the recommended rule (i.e. leading indicators with the system recommended conditions).

Clicking the create rule button may open up a rules app (not shown) and populate a new rule automatically for the selected condition on the conditions page 215. The target resource data may be finalized and may include an equipment model identifier, a time period such as a standard triggered event time period or the time period from an asset central indicator definition, conditions (e.g., aggregators, attributes, or indicators) with values from the condition selected, and the like. The rules can include alert types/alerts. Alert types may be used for managing different types of alerts for each model. Alert types/alerts specify whether it is a machine-generated alarm (error code) or via software rules. The rules can be enriched with business semantics like measured parameters, possible failure modes, and alarm categories. When creating a rule the alert type may be selected. Once the create rule button is selected, the system may translate the leading indicators and any other information used to enrich the rules into a monitoring rule.

FIG. 3 illustrates a process 300 of predicting leading indicators based on an event prediction algorithm 320 in accordance with an example embodiment. It should be appreciated that the example of FIG. 3 is just one possible example of a process for predicting leading indicators using a surrogate model. However, other possible predictive models are possible such as decision tree rules, association rule mining, time-series sequence pattern mining, and the like. Additional examples of the types of predictive models are further described below. Referring to FIG. 3, a target resource (target asset 310) may be implemented with the event prediction model 320 such as a failure prediction model, etc. The event prediction model 320 may be executed by the target asset 310, by a computer connected to the target asset 310, by a backend platform that receives data from the target asset 310, and the like. In this example, the target asset 310 is a pump, but embodiments are not limited thereto. Here, the event prediction model 320 may receive sensor data (temperature 312, pressure 314, and flow rate 316) which are sensed/acquired by sensors that are positioned on, about, around, etc., the target asset 310. The event prediction model 320 may include a machine learning model that predicts the occurrence of an event at the target asset 310 based on the received sensor data 312, 314, and 316. An output 322 of the event prediction model 320 may include a classification (yes or no) indicating yes the event is predicted to occur or no the event is not predicted to occur.

According to various embodiments, a surrogate model 330 may receive data associated with the event prediction model 320 to determine leading indicators for an event at the target asset 310. For example, the surrogate model 330 may receive the input sensor data (312, 314, and 316) of the event prediction model 320, and the predicted output 322 of the event prediction model 320, from historical datasets. The surrogate model 330 may include a machine learning model that identifies patterns between the input sensor data 312, 314, and 316, and the predicted output 322. Here, the surrogate model 330 may not be concerned with the particular algorithm that is performed by the event prediction model 320. Rather, the surrogate model 330 may be looking for patterns between the input sensor data 312, 314, and 316, and the output 322 which indicates predicted occurrence of the event. Accordingly, the surrogate model 330 may identify leading indicators 332 of the occurrence of an event based on patterns between the inputs 312, 314, and 316, and the predicted output 322 of the event prediction model 320.

As an example, the surrogate model 330 may be used to analyze a failure prediction model for the target asset 310. In this case, the system may use a black-box model for the failure prediction algorithm, and interpret what input patterns cause the black-box model to make certain prediction outputs. Based on these rules, leading indicators may be identified as well as their conditions. The surrogate model 330 may analyze the prediction and output information about why these failures are being predicted.

As mentioned above, other types of processes and predictive models may be used to predict the leading indicators. Examples include, but are not limited to, decision tree rules in which a tree-based algorithm can be used to create a failure prediction model. In this example, the rules for identifying leading indicators can be derived from each distinct path through the tree starting from a certain decision node. Another example is association rules mining which can use a machine learning method for discovering relationships and co-occurring associations between the input and the event pertaining to the target resource. As yet another example, a time-series sequence pattern mining may be used which relies on a sequential data mining technique that takes into consideration pattern sequences ordered by time in order to deduce its correlation to prediction of events. The prediction, in this example, can be achieved by adapting a spatio-temporal pattern network using rectilinear linear unit with hidden activation functions in a deep neural network or by employing discretized time-series algorithms using piecewise aggregate approximation. It should also be appreciated that other techniques may be used, and these examples should not be construed as an exhaustive example of the types of algorithms which can be used to predict leading indicators.

Figure 4:
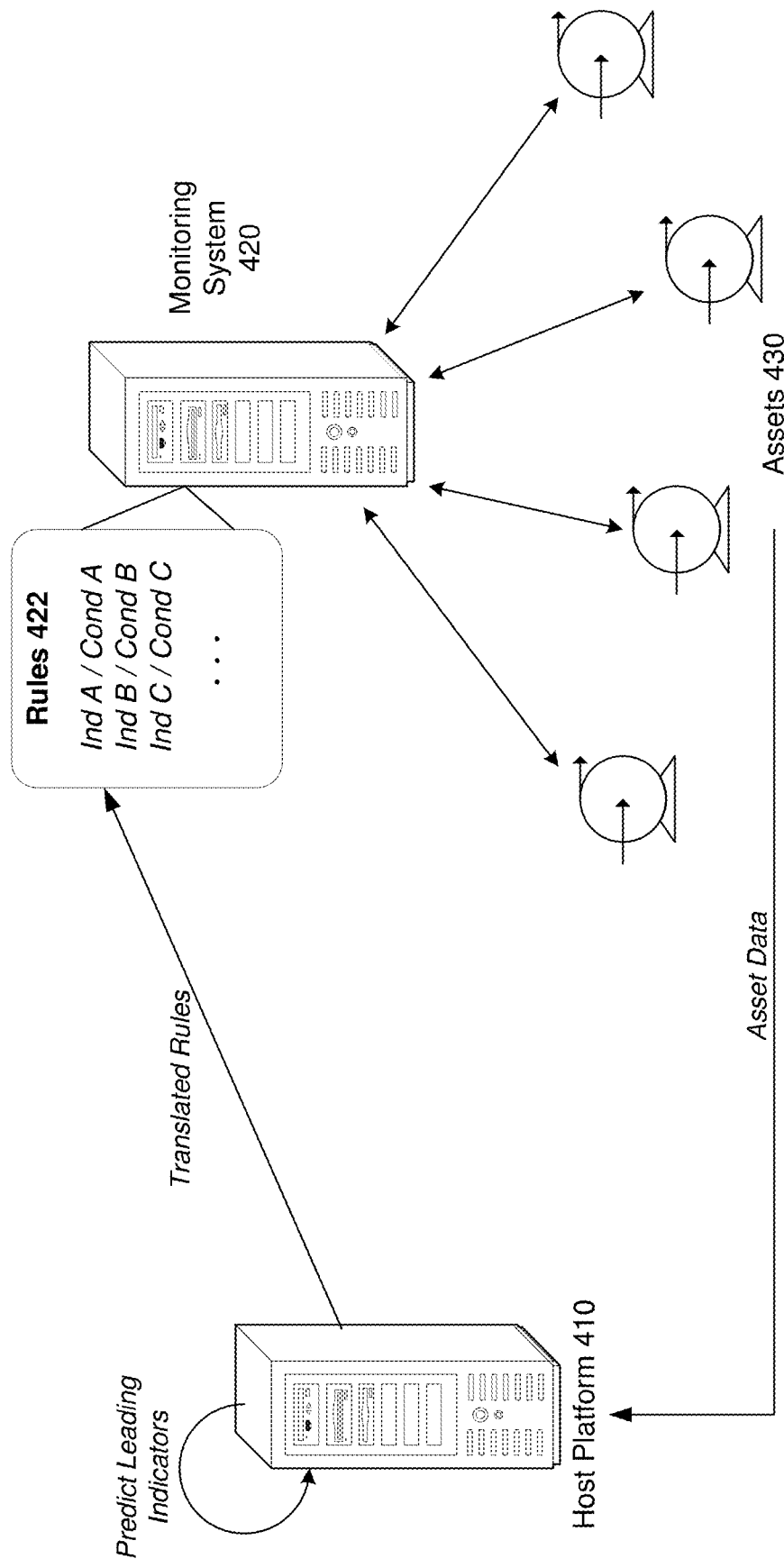
FIG. 4 is a diagram illustrating monitoring rules being created based on predicted leading indicators in accordance with an example embodiment.

FIG. 4 illustrates a process 400 of monitoring rules being created based on predicted leading indicators in accordance with an example embodiment. Referring to FIG. 4, a host platform 410 collects asset data from and/or about a plurality of assets 430. The asset data may include time-series measured data captured of the operation of the assets 430 and/or other attributes of the assets 430 such as age, operator information (experience, certifications, etc.), manufacturer information, model type, and the like. Based on the collected asset data, the host platform 410 may predict one or more leading indicators of an event associated with the assets. Events may include failures, customer complaints, error codes, and the like. Furthermore, the host platform 410 may translate the leading indicators into monitoring rules which can be used by a monitoring application hosted by monitoring system 420. The monitoring system 420 can incorporate the monitoring rules and monitor the assets 430 to predict when an event will occur based on the monitoring rules. In response to detecting a future occurrence of an event is likely, the monitoring system 420 may output an alarm or notification via a user interface/dashboard of a user who access the monitoring system 420 via local or remote user device. As another example, the monitoring system 420 may send a message (SMS, email, etc.) to a predefined user account associated with the asset.

The combinations of leading indicators and thresholds associated therewith may be referred to as the conditions. The host platform 410 can translate these conditions into rules that correlate to a specific event (e.g., overheating of a pump, etc.) This rule can be added and executed by a monitoring system (such as a CBM) that is monitoring the assets 430 against these rules. In some cases, the host platform 410 and the monitoring system 420 may be the same entity, or they may be separate. The host platform 410 may convert the leading indicators and conditions into rules that are then incorporated into a CBM application that monitors the assets 430. In this scenario, the leading indicators are identified from assets 430 and their data, and then used to monitor the same assets 430 at their location. The next step is then converting these leading indicators and conditions into rules. This is an automated process that can be performed by simply a user clicking a button (e.g., button 230 shown in FIG. 2B).

As a non-limiting example, monitoring rules may include look for a condition #1, and if it occurs then take some next step such as output an alert, look for a second condition (condition #2), pull additional data of the asset (age, etc.) and evaluate this information. In some embodiments, the occurrence of the condition may trigger a rule (causing an alarm or an alert, such as a dashboard blinking, SMS message, email, etc.)

Typically machine learning comes up with data that people don't actually look at, and don't really know whether its trustworthy. It's more of a feel or a guess based on user experience, whereas the system herein provides a valid/verifiable leading indicator that is data driven from historical data. The determination of the leading indicators are provable. It takes out the human element by providing leading indicators that are highly explainable and understandable to a user. The system may further notify a user when a pump is about to fail. Furthermore, as evidence, the system may show the operator which sensors and values are abnormal and why the system is predicting that there is going to be an event (historical cases that are similar, etc.) Typical CBM monitoring does no provide much explanation but rather is simply a prediction (fail or not fail) or the system is abnormal. In contrast, the example embodiments provide a highly explainable list of indicators and conditions that are data driven from historical data.

FIG. 5 illustrates a method 500 of predicting leading indicators of an event in accordance with an example embodiment. For example, the method 500 may be performed by an industrial PC, an asset controller, a server, a cloud platform, a user device, and/or the like. Referring to FIG. 5, in 510, the method may include receiving operating data of a target resource. Here, the target resource may be a machine or an equipment, the event may be a breakdown, an error code, quality event, customer complaint, warranty claim, or any other type of event, and the operating data may be data that is sensed of a measurable attribute or variable of the target resource. As another example, the target resource may be a model type of an equipment or machine. The model type may represent a class equipment or machines of the same type. According to various embodiments, the operating data may be include data that is measured from the asset prior to and during previous occurrences of an event at the target resource. As another example, the operating data may include input data, output data, data collected from a past timeline related to machine components/systems upstream to the target resource, and the like, which is used by a fault predicting algorithm for the target resource. The fault predicting algorithm may predict failures of the machine or equipment. The state of what is a "failure" can be dynamically defined by a client, an operator, a manufacturer, or the like.

In 520, the method may include predicting one or more leading indicators of the event at the target resource based on the received operating data. For example, each leading indicator may include a variable and a threshold value for the variable. In some embodiments, the variable may be a measured time-series value that is captured by sensors such as pressure, humidity, temperature, velocity, flow rate, and the like, while the threshold value may include an amount or a range of values that indicate future occurrence of the event. As another example, the variable may include a measured time-series value of another resource such as an upstream resource that feeds material or otherwise effects operation of the target resource. As another example, the variable may include information about an operator of the target resource such as a skill level, certifications received, and the like. Furthermore, in 530, the method may include outputting information about the one or more predicted leading indicators of the target resource for display via a user interface.

In some embodiments, the target resource may be an equipment such as a pump or a machine such as a turbine which performs an industrial operation, and the operating data may include sensor data from one or more sensors that are positioned on, around, in association with, etc., the asset and which capture information about the target resource during performance of the industrial operation. In some embodiments, a predicted leading indicator may include a time-series variable and one or more of a lower value threshold and an upper value threshold for the time-series variable. In some embodiments, predicted leading indicator may include one or more identified sensors and respective threshold values for the one or more identified sensors indicating an anticipated failure of the target resource. In some embodiments, the method may further include inserting the one or more predicted leading indicators into a monitoring application which monitors the operating data of the target resource over time.

Figure 6:
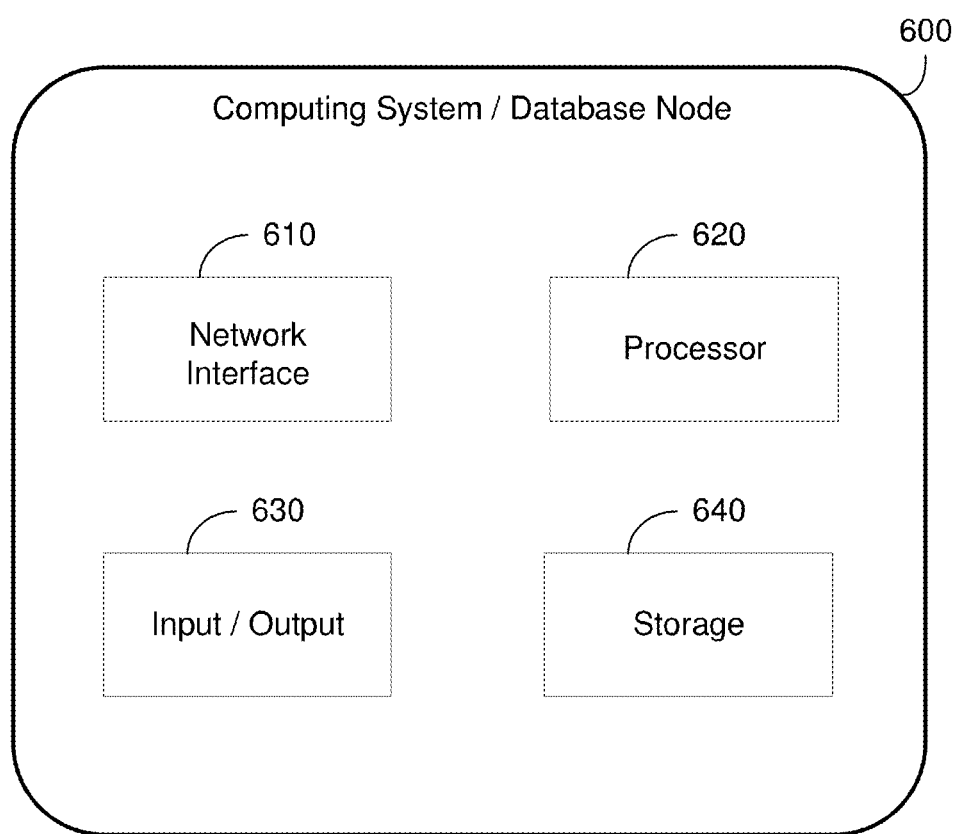
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 6. According to various embodiments, the storage 640 may include a data store having a plurality of tables, partitions and sub-partitions. The storage 640 may be used to store database records, items, entries, and the like. Also, the storage 640 may store data that is sensed by one or more sensors. Sensor data may include pressure, humidity, temperature, flow rate, and the like. In some cases, the storage 640 may store information about an operator such as skill level and/or certifications. For example, the storage 640 may store operating data of a target resource which is collected locally, received via the network interface 610, and the like. The operating data may be associated with previous occurrences of an event at the target resource.

According to various embodiments, the processor 620 may predict one or more leading indicators of the event at the target resource based on the received operating data. In some embodiments, each leading indicator may include a variable and a threshold value for the variable. Furthermore, the processor 620 may output information about the one or more predicted leading indicators of the target resource for display via a user interface. In some embodiments, the processor 620 may insert the one or more predicted leading indicators into a monitoring application which monitors the operating data of the target resource over time. The monitoring application may be executed by the processor 620 and used locally, or it may be executed by a remote device (e.g., cloud platform, server, user device, etc.)

In the examples herein, the target resource may include a machine or an equipment, and the event may include a hardware failure, a warranty claim, a customer complaint, an error code being displayed, and the like. In some embodiments, the target resource may perform an industrial operation, and the stored operating data may include sensor data captured of the target resource during performance of the industrial operation. In some embodiments, the operating data may include sensor data of one or more upstream resources that effect operation of the target resource. The leading indicator may include a time-series variable and one or more of a lower value threshold and an upper value threshold for the time-series variable. The leading indicator may include an identified sensor and at least one threshold value for the sensor indicating an anticipated event of the target resource. In some embodiments, a predicted leading indicator may include a skill level of an operator of the target resource.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store operating data of a target resource which includes a plurality of variables; and
a processor configured to
generate a plurality of predicted outputs, via execution of a machine learning model, each predicted output indicating whether or not a future event will occur at the target resource, wherein the machine learning model receives inputs including the plurality of variables in the stored operating data to generate the plurality of predicted outputs, and
learn, via execution of a surrogate machine learning model, one or more leading indicators of the event at the target resource based on prediction patterns between the inputs and the plurality of predicted outputs of the machine learning model identified by the surrogate machine learning model, wherein a leading indicator from among the one or more leading indicators comprises a variable and a conditional threshold value for the variable which is most closely correlated to the machine learning model predicting the occurrence of the event,
wherein the processor is further configured to receive an input via a user interface, incorporate the variable and the conditional threshold value for the variable into a monitoring rule, and monitor the asset for the event based on the monitoring rule.

2. The computing system of claim 1, wherein the target resource comprises at least one of a machine and equipment, and the event comprises at least one of a hardware failure, an error code, a warranty claim, and a customer complaint.

3. The computing system of claim 1, wherein the target resource performs an industrial operation, and the stored operating data comprises sensor data captured of the target resource during performance of the industrial operation.

4. The computing system of claim 1, wherein the operating data comprises at least one of sensor data of one or more upstream resources that effect operation of the target resource and historical system data of the one or more upstream resources.

5. The computing system of claim 1, wherein at least one leading indicator comprises a time-series variable and one or more of a lower value threshold and an upper value threshold for the time-series variable.

6. The computing system of claim 1, wherein the one or more predicted leading indicators comprise one or more identified sensors and respective conditional threshold values for the one or more identified sensors that are most closely correlated to a predicted failure of the target resource by the machine learning model.

7. The computing system of claim 1, wherein the one or more predicted leading indicators further comprise at least one of a skill level of an operator of the target resource, an age of the target resource, a model type of the target resource, and a manufacturer of the target resource.

8. The computing system of claim 1, wherein the processor is configured to monitor additional operating data of the target resource over time for occurrence of the event based on the monitoring rule.

9. A method comprising:
receiving operating data of a target resource which includes a plurality of variables;
generating a plurality of predicted outputs, via execution of a machine learning model, each predicted output indicating whether or not a future event will occur at the target resource, wherein the machine learning model receives inputs including the plurality of variables in the stored operating data to generate the plurality of predicted outputs;
learning, via execution of a surrogate machine learning model, one or more leading indicators of the event at the target resource based on prediction patterns between the inputs and the plurality of predicted outputs of the machine learning model identified by the surrogate machine learning model, wherein a leading indicator from among the one or more leading indicators comprises a variable and a conditional threshold value for the variable which is most closely correlated to the machine learning model predicting the occurrence of the event; and
receiving an input via a user interface, incorporating the variable and the conditional threshold value for the variable into a monitoring rule, and monitoring the asset for the event based on the monitoring rule.

10. The method of claim 9, wherein the target resource comprises at least one of a machine and equipment, and the event comprises at least one of a hardware failure, an error code, a warranty claim, and a customer complaint.

11. The method of claim 9, wherein the target resource comprises a model type of an equipment which represents a class of equipment having a same model type.

12. The method of claim 9, wherein the operating data comprises at least one of sensor data captured of the target resource and sensor data captured of one or more upstream resources that effect operation of the target resource and historical system data of the one or more upstream resources.

13. The method of claim 9, wherein at least one leading indicator comprises a time-series variable and one or more of a lower value threshold and an upper value threshold for the time-series variable.

14. The method of claim 9, wherein the one or more predicted leading indicators comprise one or more identified sensors and respective conditional threshold values for the one or more identified sensors that are most closely correlated to a predicted failure of the target resource by the machine learning model.

15. The method of claim 9, wherein the one or more predicted leading indicators further comprise at least one of a skill level of an operator of the target resource, an age of the target resource, a model type of the target resource, and a manufacturer of the target resource.

16. The method of claim 9, wherein the method comprises monitoring additional operating data of the target resource over time for occurrence of the event based on the monitoring rule.

17. A non-transitory computer-readable medium storing program instructions which when executed by a processor cause a computer to perform a method comprising:
receiving operating data of a target resource which includes a plurality of variables;
generating a plurality of predicted outputs, via execution of a machine learning model, each predicted output indicating whether or not a future event will occur at the target resource, wherein the machine learning model receives inputs including the plurality of variables in the stored operating data to generate the plurality of predicted outputs;
learning, via execution of a surrogate machine learning model, one or more leading indicators of the event at the target resource based on prediction patterns between the inputs and the plurality of predicted outputs of the machine learning model identified by the surrogate machine learning model, wherein a leading indicator from among the one or more leading indicators comprises a variable and a conditional threshold value for the variable which is most closely correlated to the machine learning model predicting the occurrence of the event; and
receiving an input via a user interface, incorporating the variable and the conditional threshold value for the variable into a monitoring rule, and monitoring the asset for the event based on the monitoring rule.

18. The non-transitory computer-readable medium of claim 17, wherein the target resource comprises at least one of a machine and equipment, and the event comprises at least one of a hardware failure, an error code, a warranty claim, and a customer complaint.

19. The non-transitory computer-readable medium of claim 17, wherein the target resource performs an industrial operation, and the operating data comprises sensor data captured of the target resource during performance of the industrial operation.

20. The non-transitory computer-readable medium of claim 17, wherein at least one leading indicator comprises a time-series variable and one or more of a lower value threshold and an upper value threshold for the time-series variable.

21. The computing system of claim 1, wherein the machine learning model is configured to predict occurrence of a failure event at the target resource based on the stored operating data, and the processor is configured to predict, via execution of the surrogate model, one or more leading indicators of the failure event at the target resource based on patterns between the inputs and the predicted outputs of the machine learning model which are identified by the surrogate machine learning model.

* * * * *